(12) United States Patent
Yoo et al.

(10) Patent No.: US 12,373,008 B2
(45) Date of Patent: Jul. 29, 2025

(54) ELECTRONIC DEVICE

(71) Applicant: Samsung Electronics Co., Ltd., Suwon-si (KR)

(72) Inventors: Jangsun Yoo, Suwon-si (KR); Kwanghyun Kim, Suwon-si (KR); Myeonggil Lee, Suwon-si (KR); Jihye Moon, Suwon-si (KR); Kyueun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 18/188,057

(22) Filed: Mar. 22, 2023

(65) Prior Publication Data

US 2023/0221775 A1    Jul. 13, 2023

Related U.S. Application Data

(63) Continuation of application No. PCT/KR2021/012992, filed on Sep. 24, 2021.

(30) Foreign Application Priority Data

Sep. 24, 2020    (KR) .................. 10-2020-0124270

(51) Int. Cl.
G06F 1/16        (2006.01)
H01Q 1/22        (2006.01)
H01Q 1/36        (2006.01)

(52) U.S. Cl.
CPC .......... *G06F 1/1688* (2013.01); *G06F 1/1656* (2013.01); *G06F 1/1698* (2013.01); *H01Q 1/2266* (2013.01); *H01Q 1/36* (2013.01)

(58) Field of Classification Search
CPC .... G06F 1/1688; G06F 1/1698; H01Q 1/2266
See application file for complete search history.

(56) References Cited

U.S. PATENT DOCUMENTS 6,614,400 B2 *   9/2003   Egorov .................. H01Q 5/357
                                                           343/702
6,687,120 B2 *   2/2004   Hood .................... G06F 1/1616
                                                           361/679.09

(Continued)

FOREIGN PATENT DOCUMENTS

JP    2014-110632 A    6/2014
JP    2019-125849 A    7/2019

(Continued)

OTHER PUBLICATIONS

European Search Report dated Feb. 1, 2024, issued in European Application No. 21872920.0.

(Continued)

*Primary Examiner* — Adrian S Wilson
(74) *Attorney, Agent, or Firm* — Jefferson IP Law, LLP

(57) ABSTRACT

An electronic device including a housing is provided. The electronic device includes a display module, a communication module, a processor, and a speaker, wherein the speaker includes a speaker enclosure in which a first case and a second case are combined, and the speaker enclosure is arranged in the inner space of the housing and spaced apart from the housing at a predetermined interval, a first antenna pattern is arranged on the surface of the first case, a second antenna pattern is arranged on the surface of the second case, the first antenna pattern and the second antenna pattern are electrically coupled to each other, and the first antenna pattern and the second antenna pattern may be arranged to prevent overlapping with a speaker component arranged inside the speaker enclosure.

16 Claims, 23 Drawing Sheets

(56) References Cited

U.S. PATENT DOCUMENTS

| | | | |
|---|---|---|---|
| 6,987,485 B2* | 1/2006 | Ito | H01Q 9/26 |
| | | | 343/702 |
| 7,183,983 B2* | 2/2007 | Ozden | H01Q 5/371 |
| | | | 343/702 |
| 7,551,142 B1* | 6/2009 | Zhang | H01Q 5/371 |
| | | | 343/702 |
| 9,178,278 B2* | 11/2015 | Zhu | H01Q 1/2266 |
| 9,203,137 B1 | 12/2015 | Guterman et al. | |
| 9,948,342 B2* | 4/2018 | Shi | H04R 1/06 |
| 10,756,415 B2* | 8/2020 | Wu | H01Q 9/42 |
| 10,862,190 B1* | 12/2020 | Ramasamy | G06F 1/1688 |
| 2003/0072131 A1* | 4/2003 | Hood | G06F 1/1688 |
| | | | 361/679.09 |
| 2004/0097270 A1* | 5/2004 | Cha | H01Q 1/243 |
| | | | 455/562.1 |
| 2005/0041624 A1* | 2/2005 | Hui | H01Q 1/521 |
| | | | 370/335 |
| 2008/0106478 A1* | 5/2008 | Hill | H01Q 1/38 |
| | | | 343/702 |
| 2009/0061966 A1* | 3/2009 | Yang | H04M 1/03 |
| | | | 455/575.7 |
| 2009/0174611 A1* | 7/2009 | Schlub | H01Q 9/0407 |
| | | | 343/702 |
| 2009/0257207 A1* | 10/2009 | Wang | H04M 1/0252 |
| | | | 361/752 |
| 2013/0070952 A1* | 3/2013 | Mai | H04R 1/028 |
| | | | 381/394 |
| 2013/0127672 A1* | 5/2013 | Zhu | H01Q 1/2266 |
| | | | 343/866 |
| 2014/0009344 A1* | 1/2014 | Zhu | H01Q 1/2266 |
| | | | 343/702 |
| 2014/0153769 A1 | 6/2014 | Chen et al. | |
| 2014/0193023 A1 | 7/2014 | Heo et al. | |
| 2015/0311594 A1 | 10/2015 | Zhu et al. | |
| 2016/0323003 A1 | 11/2016 | Shi et al. | |
| 2017/0373374 A1 | 12/2017 | Moon et al. | |
| 2019/0027808 A1 | 1/2019 | Mow et al. | |
| 2019/0220067 A1 | 7/2019 | Sugiura et al. | |
| 2020/0091608 A1 | 3/2020 | Alpman et al. | |
| 2020/0274239 A1 | 8/2020 | Amano et al. | |
| 2021/0218135 A1* | 7/2021 | Ramasamy | H04R 1/023 |

FOREIGN PATENT DOCUMENTS

| | | |
|---|---|---|
| JP | 2020-140406 A | 9/2020 |
| KR | 10-2008-0047206 A | 5/2008 |
| KR | 10-0826840 B1 | 5/2008 |
| KR | 10-2009-0126001 A | 12/2009 |
| KR | 10-2014-0090355 A | 7/2014 |
| KR | 10-2016-0108138 A | 9/2016 |
| KR | 10-2019-0089955 A | 7/2019 |

OTHER PUBLICATIONS

International Search Report with Written Opinion dated Dec. 29, 2021; International Appln. No. PCT/KR2021/012992.
European Search Report dated Dec. 3, 2024, issued in European Application No. 21872920.0.
Korean Search Report dated Dec. 18, 2024, issued in Korean Application No. 10-2020-0124270.

* cited by examiner

ELECTRONIC DEVICE

CROSS-REFERENCE TO RELATED APPLICATION(S)

This application is a continuation application, claiming priority under § 365(c), of an International application No. PCT/KR2021/012992, filed on Sep. 24, 2021, which is based on and claims the benefit of a Korean patent application number 10-2020-0124270, filed on Sep. 24, 2020, in the Korean Intellectual Property Office, the disclosure of which is incorporated by reference herein in its entirety.

BACKGROUND

1. Field

The disclosure relates to an electronic device including a speaker-integrated antenna.

2. Description of Related Art

Electronic devices may be provided in various forms such as a smartphone, a laptop, a tablet personal computer (PC), and the like with the development of digital technology. Such a hand-held type electronic device tends to have a complex function and become luxurious.

Recently, electronic devices include a wireless communication function such as data communication including the Internet as an essential element in order to provide various services to users. A streaming service may be counted as one of the most frequently used services by users using a wireless communication function. In order to use a streaming service smoothly, a seamless wireless communication function, and high-output and high-performance speaker sound quality should be supported.

However, under the trend of miniaturization of electronic devices, it is difficult to mount an antenna for wireless communication and a speaker having improved sound quality to the inside thereof.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a speaker-integrated antenna and may provide an electronic device capable of securing an internal mounting space.

Additional aspects will be set forth in part in the description which follows and, in part, will be apparent from the description, or may be learned by practice of the presented embodiments.

In accordance with an aspect of the disclosure, an electronic device including a housing is provided. The electronic device includes a display module, a communication module, at least one processor, and a speaker, wherein the speaker may include a speaker enclosure in which a first case and a second case are coupled to each other, wherein the speaker enclosure may be disposed in an inner space of the housing to be spaced a predetermined interval apart therefrom, wherein a first antenna pattern may be disposed on the surface of the first case and a second antenna pattern is disposed on the surface of the second case, wherein the first antenna pattern and the second antenna pattern may be electrically coupled, and wherein the first antenna pattern and the second antenna pattern may be arranged so as not to overlap a speaker unit disposed inside the speaker enclosure.

An electronic device including a speaker-integrated antenna according to various embodiments of the disclosure may have a speaker disposed inside a housing of the electronic device to be spaced apart from the housing, so as to prevent noise and/or vibration of the electronic device.

An electronic device including a speaker-integrated antenna according to various embodiments of the disclosure may have a ground pattern disposed on a surface facing antenna feeding area so as to improve antenna efficiency.

An electronic device including a speaker-integrated antenna according to various embodiments of the disclosure provides a space which allows various electronic components to be mounted inside the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
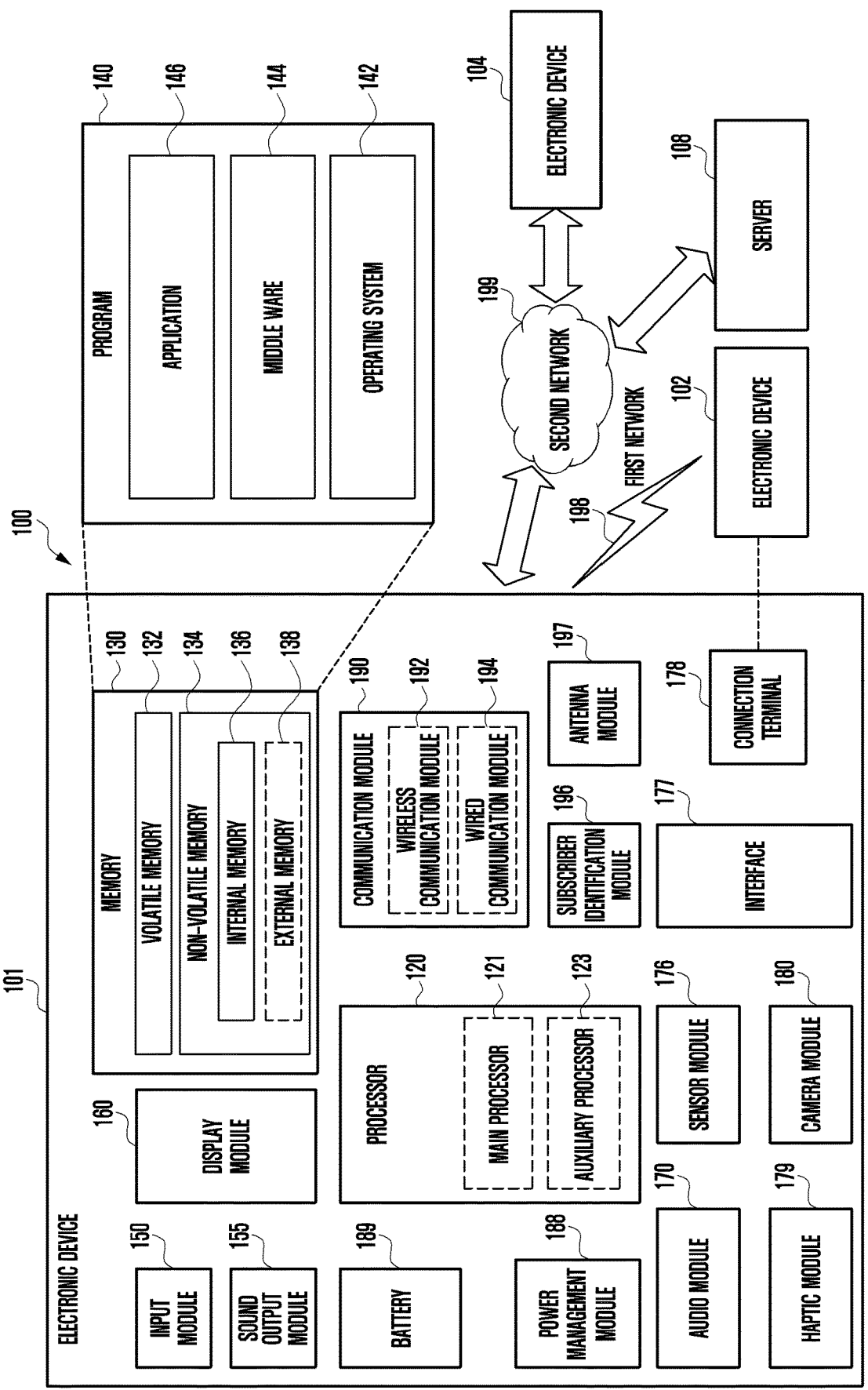
FIG. 1 is a block diagram of an electronic device wirelessly receiving power in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to another embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to another embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data includes, for example, software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 includes, for example, a microphone, a mouse, a keyboard, a key (e.g., a button), or a digital pen (e.g., a stylus pen).

The sound output module 155 may output sound signals to the outside of the electronic device 101. The sound output module 155 includes, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. The display module 160 includes, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 includes, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 includes, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 includes, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, is selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, or 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
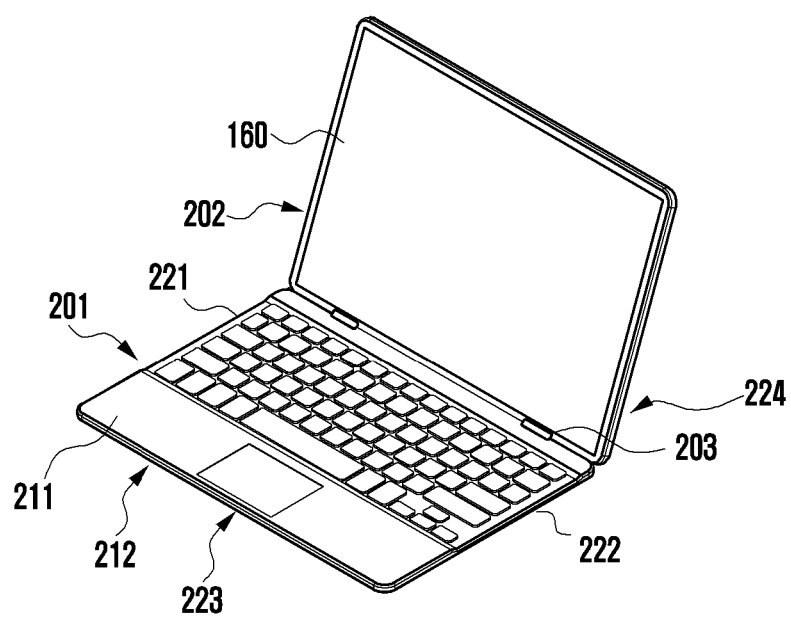
FIG. 2 is a view showing an electronic device according to an embodiment of the disclosure.

FIG. 2 is a view showing an electronic device according to an embodiment of the disclosure.

Referring to FIG. 22, the electronic device 101 may include a first housing 201 and/or a second housing 202. The first housing 201 and/or second housing 202 may be rotatably coupled to be folded while facing each other with reference to a hinge 203.

In various embodiments, the first housing 201 and/or the second housing 202 may be detachably coupled to each other. The first housing 201 may be configured as a dock of the second housing 202.

The first housing 201 may include a top cover 211 and a bottom cover 212. An input device such as a keyboard and/or a touch pad may be disposed on the top cover 211.

The first housing 201 may have a rectangular shape (e.g., the square or the rectangle) formed by the top cover 211 and the bottom cover 212 being coupled to each other.

In a state where the electronic device 101 is unfolded, the first housing 201 may be surrounded by a first side surface 221 of the left side and a second side surface 222 of the right side, a third side surface 223 which is a surface from which the front surface of a display module 160 is seen, and a fourth side surface 224 near the hinge 203.

The top cover 211 and the bottom cover 212 may be spaced to form a space, and the first side surface 221, the second side surface 222, the third side surface 223, and the fourth side surface 224 may surround the space. The second housing 202 may include the display module 160.

Figure 3:
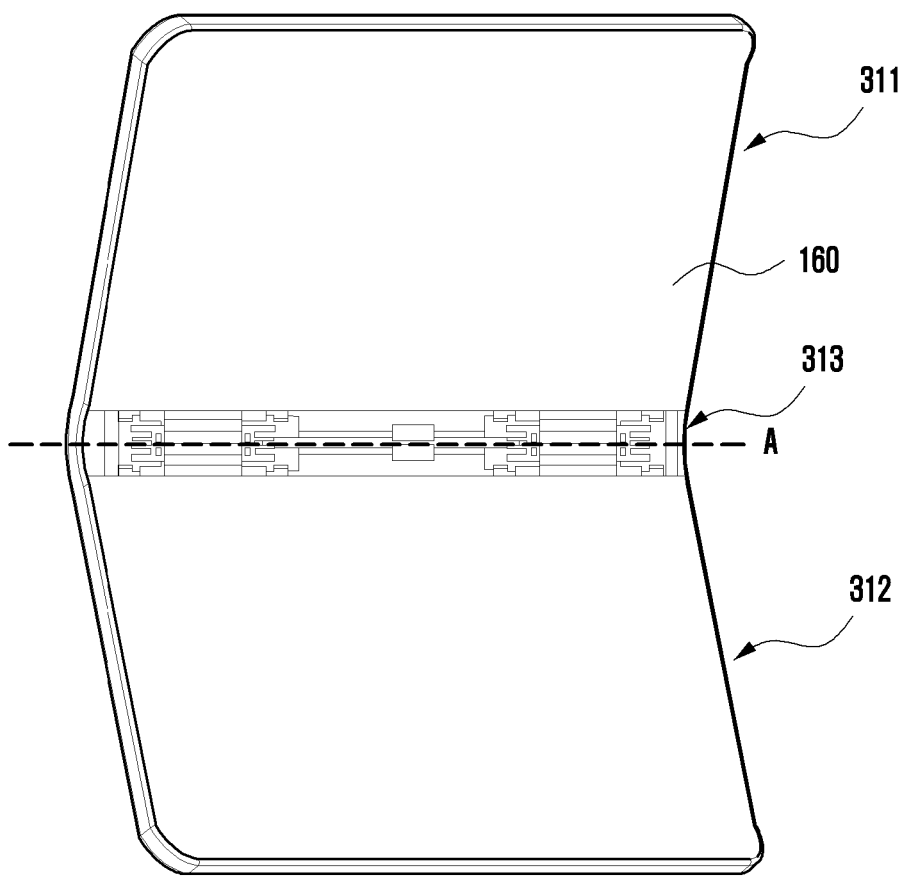
FIG. 3 is a view showing an electronic device according to an embodiment of the disclosure.

FIG. 3 is a view showing an electronic device according to an embodiment of the disclosure.

Referring to FIG. 3, an electronic device 301 may include a pair of housings 311 and 312 (e.g., foldable housings) rotatably coupled to face and be folded to each other with reference to a hinge 313. According to an embodiment, the electronic device 301 may include a flexible display 300 disposed in an area formed by the pair of housings 311 and 312.

According to an embodiment, the pair of housings 311 and 312 may be arranged at both sides around a folding axis (the axis A), and may have a substantially symmetrical shape with respect to the folding axis (the axis A). According to an embodiment, the pair of housings 311 and 312 may have different angles formed by each other or different distances from each other, depending on whether a state of the electronic device 301 is in an unfolded state (a flat state or an unfolding state), a folded state (a folding state), or an intermediate state.

Figure 4:
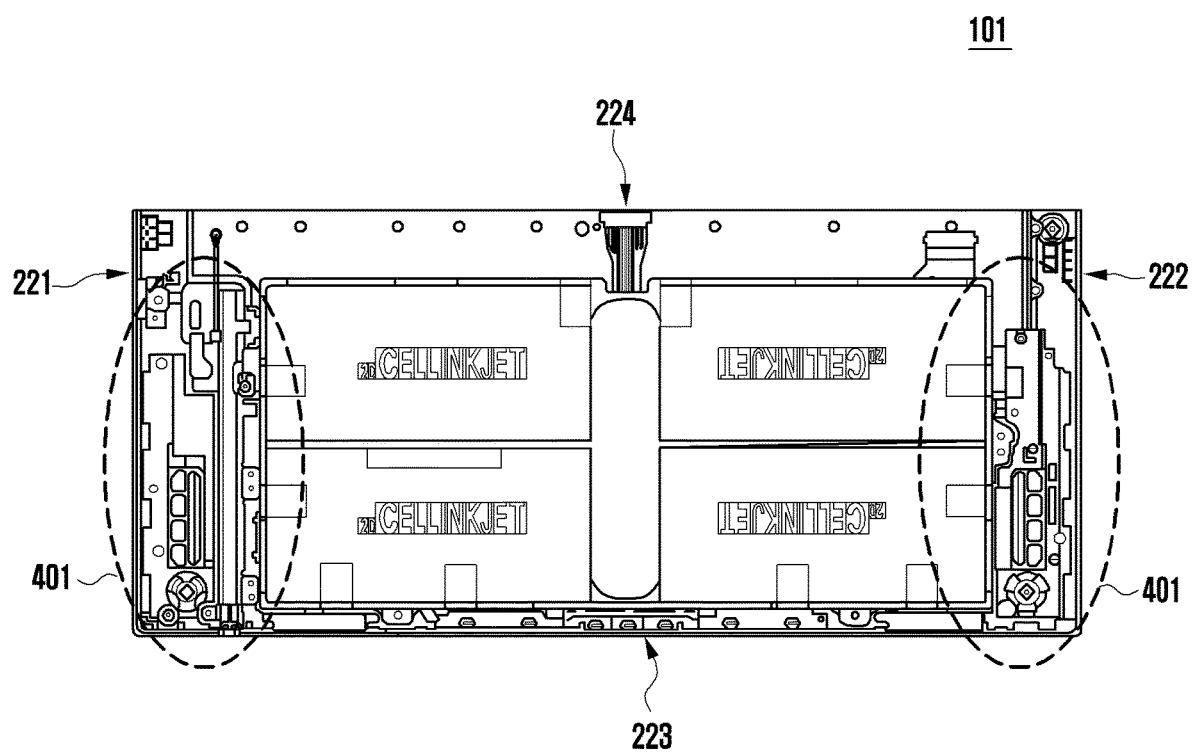
FIG. 4 is a view from which a bottom cover of an electronic device is removed according to an embodiment of the disclosure.

FIG. 4 is a view from which a bottom cover of an electronic device 101 is removed according to an embodiment of the disclosure.

Referring to FIG. 4, the top cover 211 and the bottom cover 212 may be spaced to form a space, and the first side surface 221, the second side surface 222, the third side surface 223, and the fourth side surface 224 may surround the space. At least one antenna-integrated speaker module 401 may be disposed in the inner space of the electronic device 101, which is near to the first side surface 221 and/or the second side surface 222.

Figure 5A:
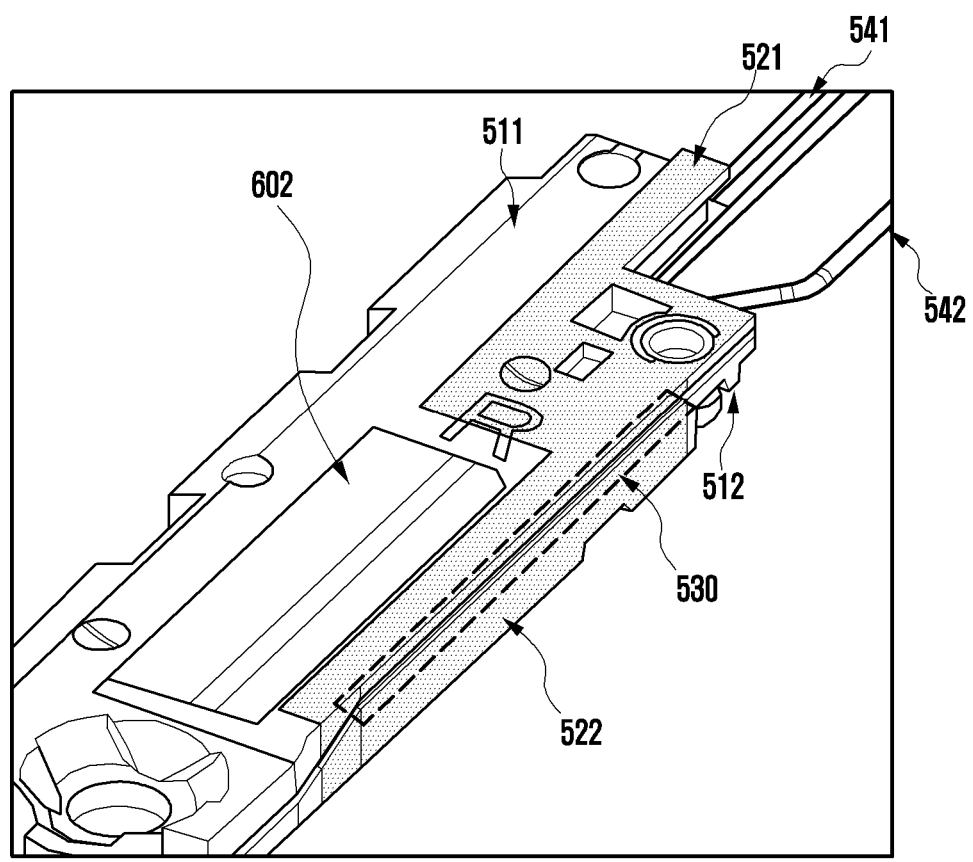
FIG. 5A is a perspective view of an antenna-integrated speaker module seen in a direction of a first case according to an embodiment of the disclosure.

FIG. 5A is a perspective view of an antenna-integrated speaker module 401 seen in the direction of a first case 511 according to an embodiment of the disclosure.

Figure 5B:
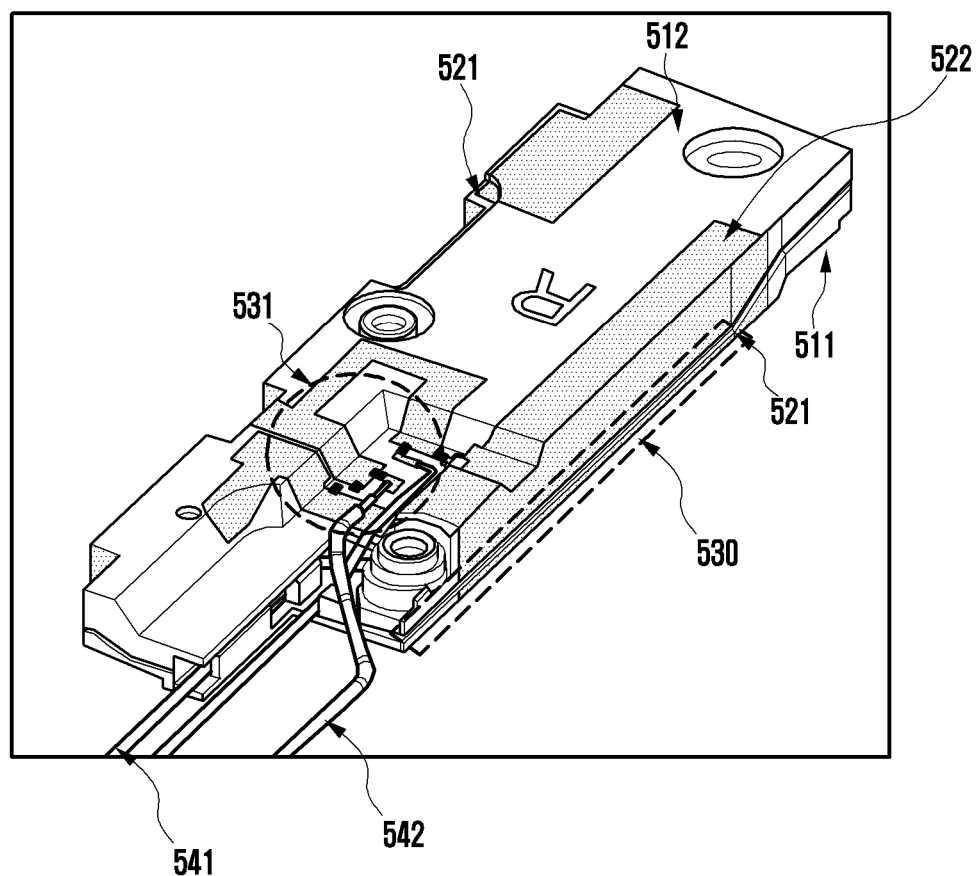
FIG. 5B is a perspective view of an antenna-integrated speaker module seen in a direction of a second case according to an embodiment of the disclosure.

FIG. 5B is a perspective view of an antenna-integrated speaker module 401 seen in the direction of a second case 512 according to an embodiment of the disclosure.

Referring to FIGS. 5A and 5B, the antenna-integrated speaker module 401 may be a device in which an antenna pattern is disposed on a speaker enclosure.

The antenna-integrated speaker module 401 may include a first case 511 and a second case 512, and the first case 511 and the second case 512 may be coupled to constitute a speaker enclosure.

The first case 511 and the second case 512 may be manufactured separately and then coupled to each other. The first case 511 and the second case 512 may be coupled to function as a speaker enclosure, and thus the first case 511 and the second case 512 should be coupled without a gap when coupled to each other. The first case 511 and the second case 512 may be coupled through ultrasonic fusing, bonding, and/or hooking.

In various embodiments, the first case 511 and the second case 512 may be integrally manufactured (e.g., molded) to form a speaker enclosure at the time of being manufactured.

The antenna-integrated speaker module 401 may include a first antenna pattern 521 and a speaker cover 602, disposed on the first case 511. The antenna-integrated speaker module 401 may include a second antenna pattern 522 and a feeding area 531, disposed on the second case 512.

In various embodiments, the first antenna pattern 521 may be a ground pattern, and the second antenna pattern 522 may be an RF radiation pattern.

In the electronic device 101, the antenna-integrated speaker module 401 may be included in the inner space of the first housing 201, the first case 511 may be disposed to face the bottom cover 212, and the second case 512 may be disposed to face the top cover 211.

At least one of the first antenna pattern 521 and/or the second antenna pattern 522 may be formed of at least one of a flexible printed circuits board (FPCB) or stainless steel.

In various embodiments, at least one of the first antenna pattern 521 and/or the second antenna pattern 522 may be a pattern formed by plating and processing on a portion which is activated by emitting laser onto the surface of a speaker enclosure (e.g., the first case 511 and/or the second case 512) by using a laser direct structuring (LDS) process.

The speaker cover 602 may be disposed on the first case 511 and may emit sound delivered from a speaker unit (i.e., the speaker unit 801 in FIG. 8A) to the outside. The speaker cover 602 may include multiple holes. The speaker unit (i.e., the speaker unit 801 in FIG. 8A) may be electrically connected to a speaker cable 541.

The antenna-integrated speaker module 401 may include a second antenna pattern 522 and a feeding area 531, disposed on the second case 512. At least a part of the second antenna pattern 522 may be coupled to the first antenna pattern 521, and may form a ground coupling area 530. At least a part of the second antenna pattern 522 may be disposed in the feeding area 531.

In various embodiments, in case that the antenna-integrated speaker module 401 is disposed in the electronic device 101, in order to prevent a feeding part of the second antenna pattern 522 from being in contact and/or interfering therewith due to a metal material of the top cover 211, the feeding area 531 may be concavely formed on at least a part of the surface of the second case 512. An antenna cable 542 and the second antenna pattern 522 may be electrically connected in the feeding area 531.

The antenna cable 542 may electrically connect the first antenna pattern 521 and/or the second antenna pattern 522 to the communication module 190 of the electronic device 101.

Figure 6A:
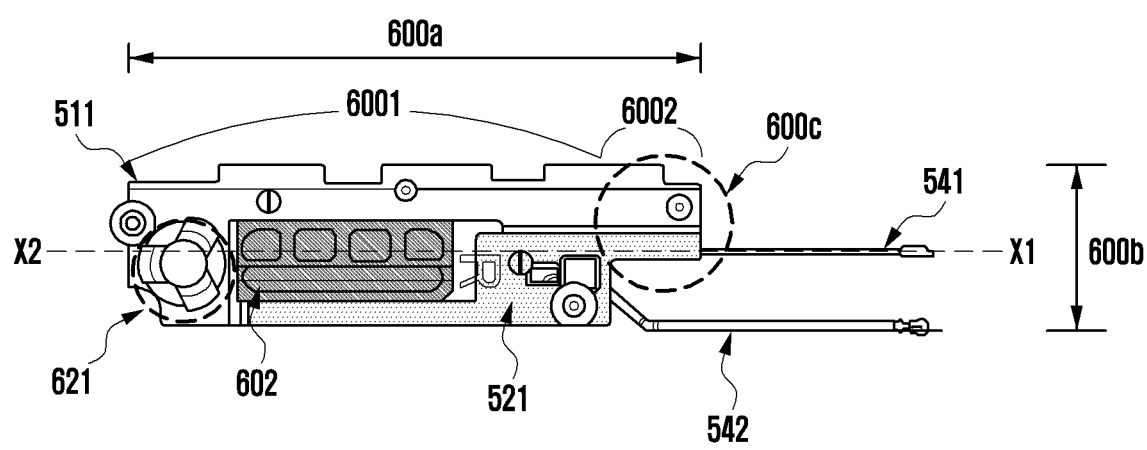
FIG. 6A is a plan view of an antenna-integrated speaker module seen from a first case according to an embodiment of the disclosure.

FIG. 6A is a plan view of an antenna-integrated speaker module 401 seen from a first case 511 according to an embodiment of the disclosure.

Figure 6B:
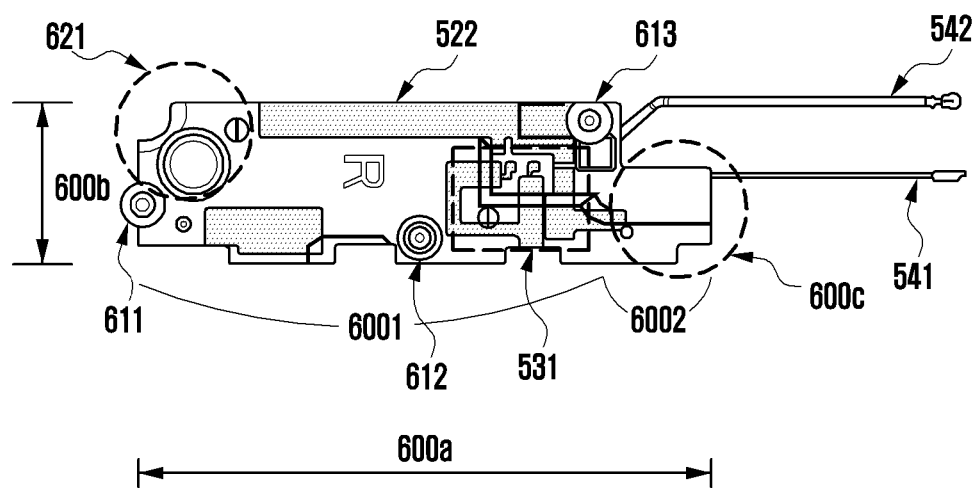
FIG. 6B is a plan view of an antenna-integrated speaker module seen from a second case according to an embodiment of the disclosure.

FIG. 6B is a plan view of an antenna-integrated speaker module 401 seen from a second case 512 according to an embodiment of the disclosure.

Figure 6C:
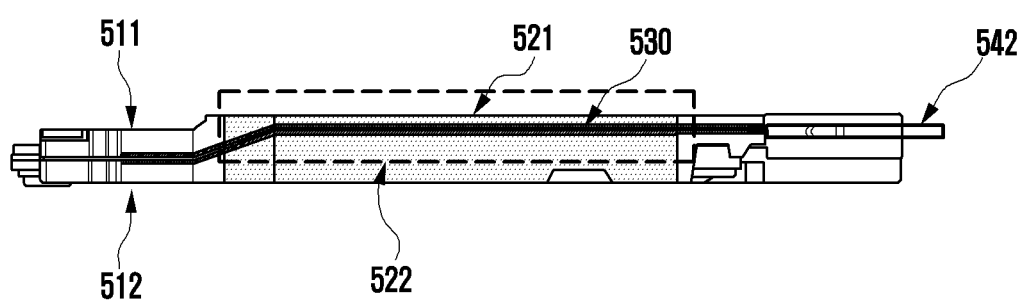
FIG. 6C is a side view of an antenna-integrated speaker module according to an embodiment of the disclosure.

FIG. 6C is a side view of an antenna-integrated speaker module 401 according to an embodiment of the disclosure.

Referring to FIGS. 6A, 6B, and 6C, the antenna-integrated speaker module 401 may have a rectangular shape (e.g., the rectangle) in which a first length 600a is longer than a second length 600b.

In various embodiments, the antenna-integrated speaker module 401 may include a protrusion structure 600c. The first length 600a of the antenna-integrated speaker module 401 may include a body length 6001 and/or a protrusion length 6002, and the protrusion structure 600c may correspond to the protrusion length 6002 extending from the body length 6001.

Figure 8A:
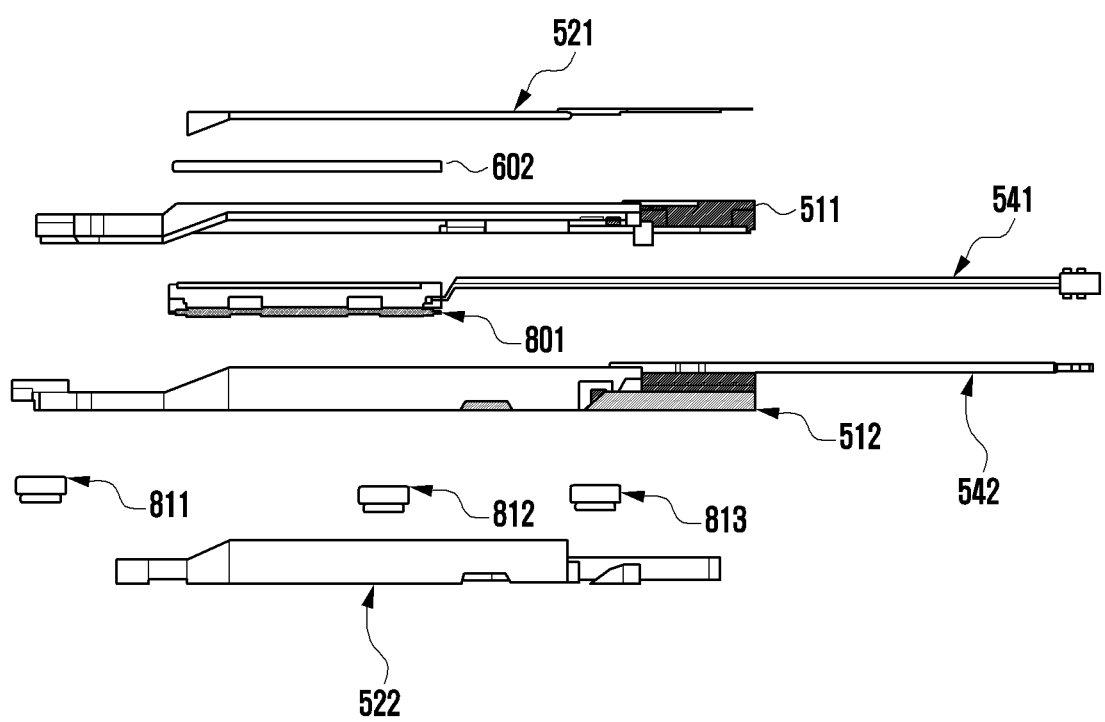
FIGS. 8A, 8B, and 8C are exploded perspective views of an antenna-integrated speaker module according to various embodiments of the disclosure.

In various embodiments, at least one of the first antenna pattern 521 or the second antenna pattern 522 may be disposed so as not to overlap a speaker unit (i.e., the speaker unit 801 in FIG. 8A). The speaker unit (i.e., the speaker unit 801 in FIG. 8A) may include an element, such as a coil, which affects the radiation efficiency of the first antenna pattern 521 and/or second antenna pattern 522, and thus the first antenna pattern 521 and/or the second antenna pattern 522 may be disposed so as not to overlap the speaker unit (i.e., the speaker unit 801 in FIG. 8A).

In various embodiments, the antenna-integrated speaker module 401 may include at least one fixation structure 611, 612, or 613. In case that the antenna-integrated speaker module 401 is seated in the electronic device 101, the antenna-integrated speaker module 401 may be seated while having a predetermined gap with the first case 511 of the electronic device 101. In order for the antenna-integrated speaker module 401 to be seated in the first case 511 while a predetermined spaced distance is maintained between the first case 511 and the antenna-integrated speaker module 401, the antenna-integrated speaker module 401 may be seated in the first case 511 by using at least one fixation member. The at least one fixation structure 611, 612, or 613 may be a hole or a shape in which the fixation member is seated. For example, the fixation member is made of rubber or silicone. The silicone may have a hardness of 30 degrees or more. The at least one fixation structure 611, 612, or 613 may be disposed to be dispersed along the direction of the first length 600*a*.

In various embodiments, the antenna-integrated speaker module 401 may include a through-hole 621 between a first fixation structure 611 and the speaker cover 602.

A second fixation structure 612 and a third fixation structure 613 may be arranged in a diagonal direction around the feeding area 531 disposed between a speaker unit (i.e., the speaker unit 801 in FIG. 8A) and the protrusion structure 600*c*.

Figure 7A:
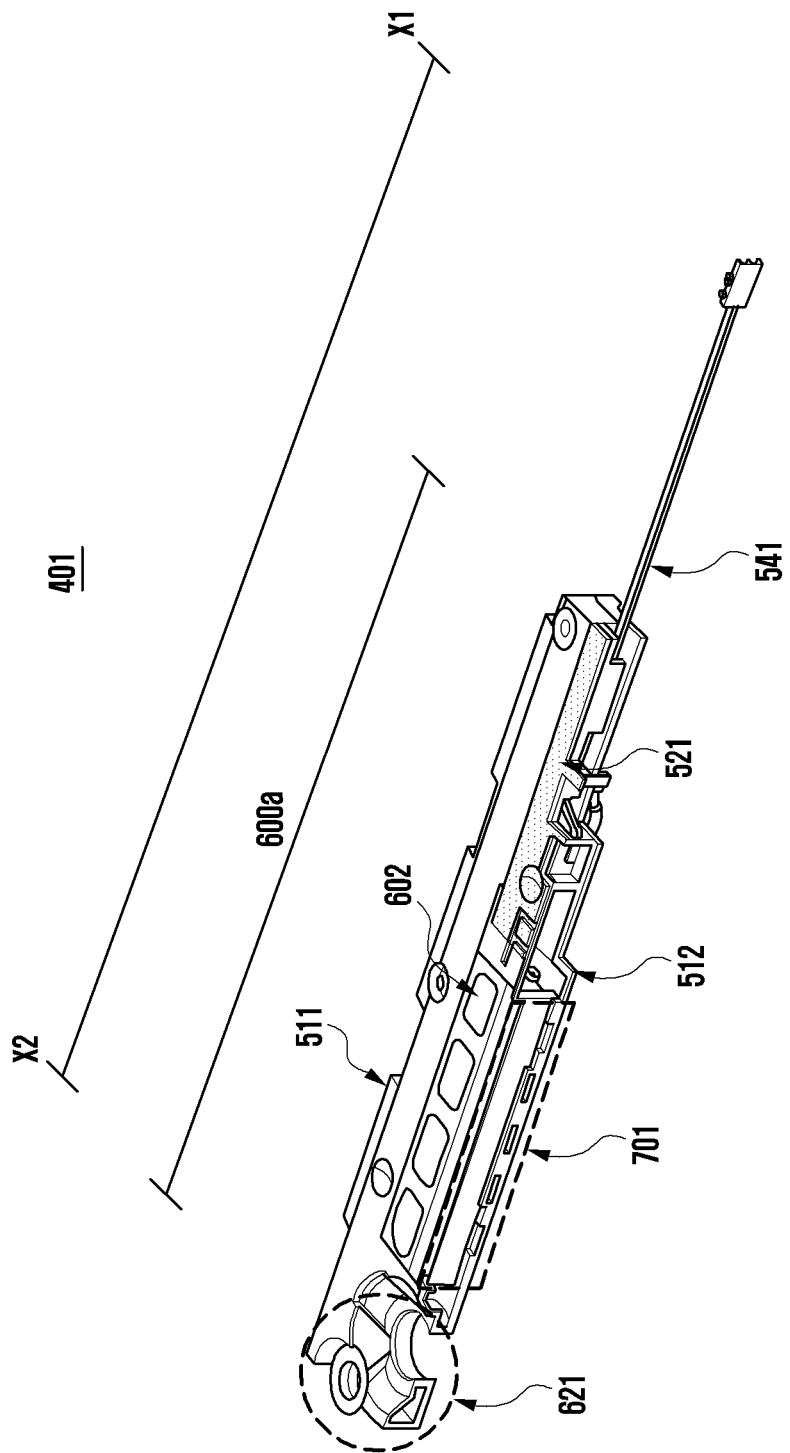
FIGS. 7A and 7B are side views in which the antenna-integrated speaker module in FIG. 6A is cut in the direction from X1 to X2 according to various embodiments of the disclosure.
Figure 7B:
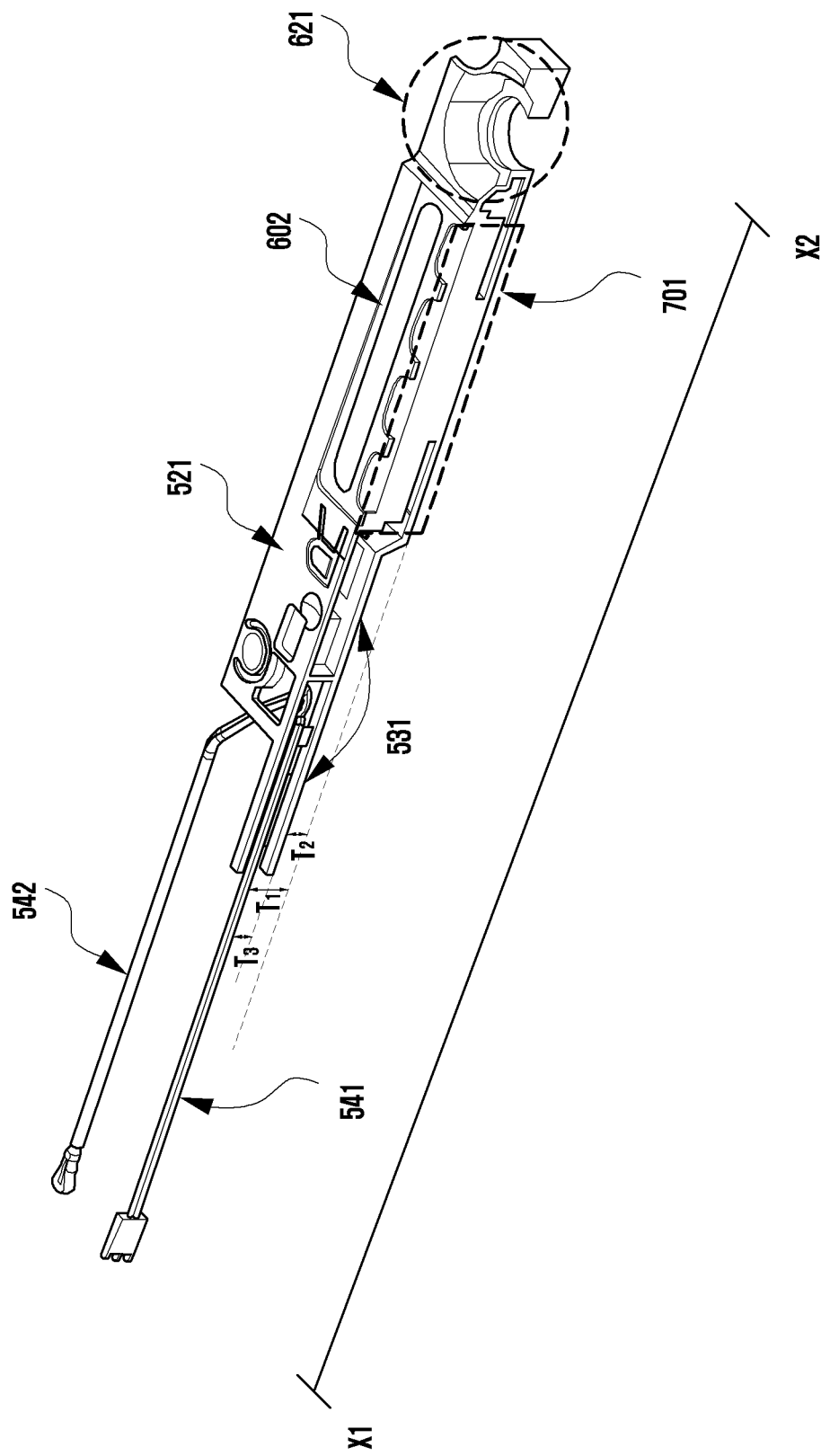

FIGS. 7A and 7B are side views in which the antenna-integrated speaker module 401 in FIG. 6A is cut in the direction from X1 to X2 according to various embodiments of the disclosure.

Referring to FIGS. 7A and 7B, the first case 511 and the second case 512 may form a speaker enclosure, and the first case 511 and the second case 512 may be coupled to form a space 701 therein. A speaker unit (i.e., the speaker unit 801 in FIG. 8A) may be disposed in the space 701. The quality of sound output from the speaker unit (i.e., the speaker unit 801 in FIG. 8A) may be improved due to the space 701 of the speaker enclosure.

If the thickness of the side surface when the first case 511 and the second case 512 are coupled is a third length T1 from the surface of the first case 511 to the surface of the second case 512, the feeding area 531 may be disposed on a surface of the second case 512, which is moved back by a fourth length T2 on at least a part of the surface of the second case 512. In the feeding area 531, the length from the surface of the first case 511 to the surface of the second case 512 may be a fifth length T3. The third length T1 may be equal to the sum of the fourth length T2 and the fifth length T3.

Figure 8B:
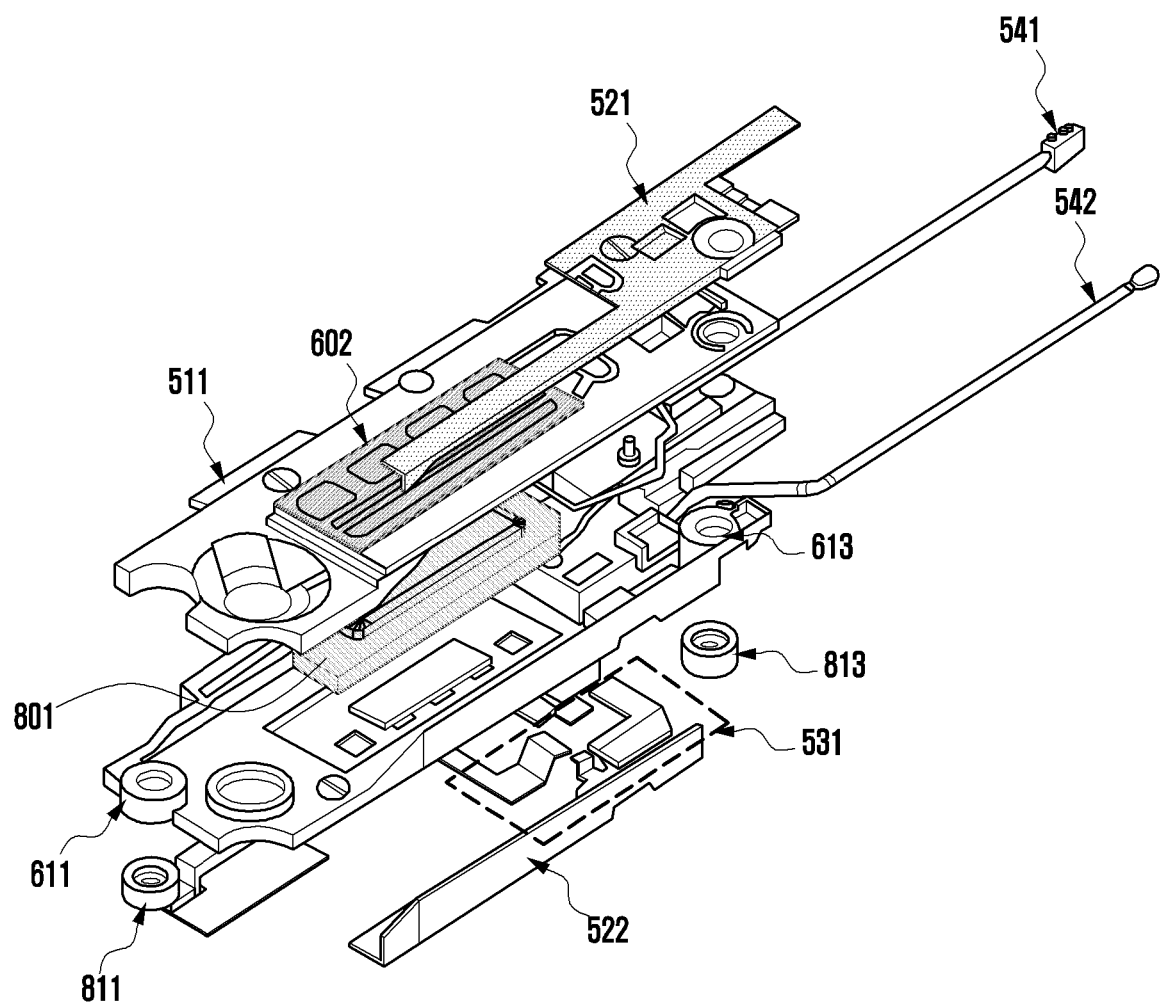
Figure 8C:
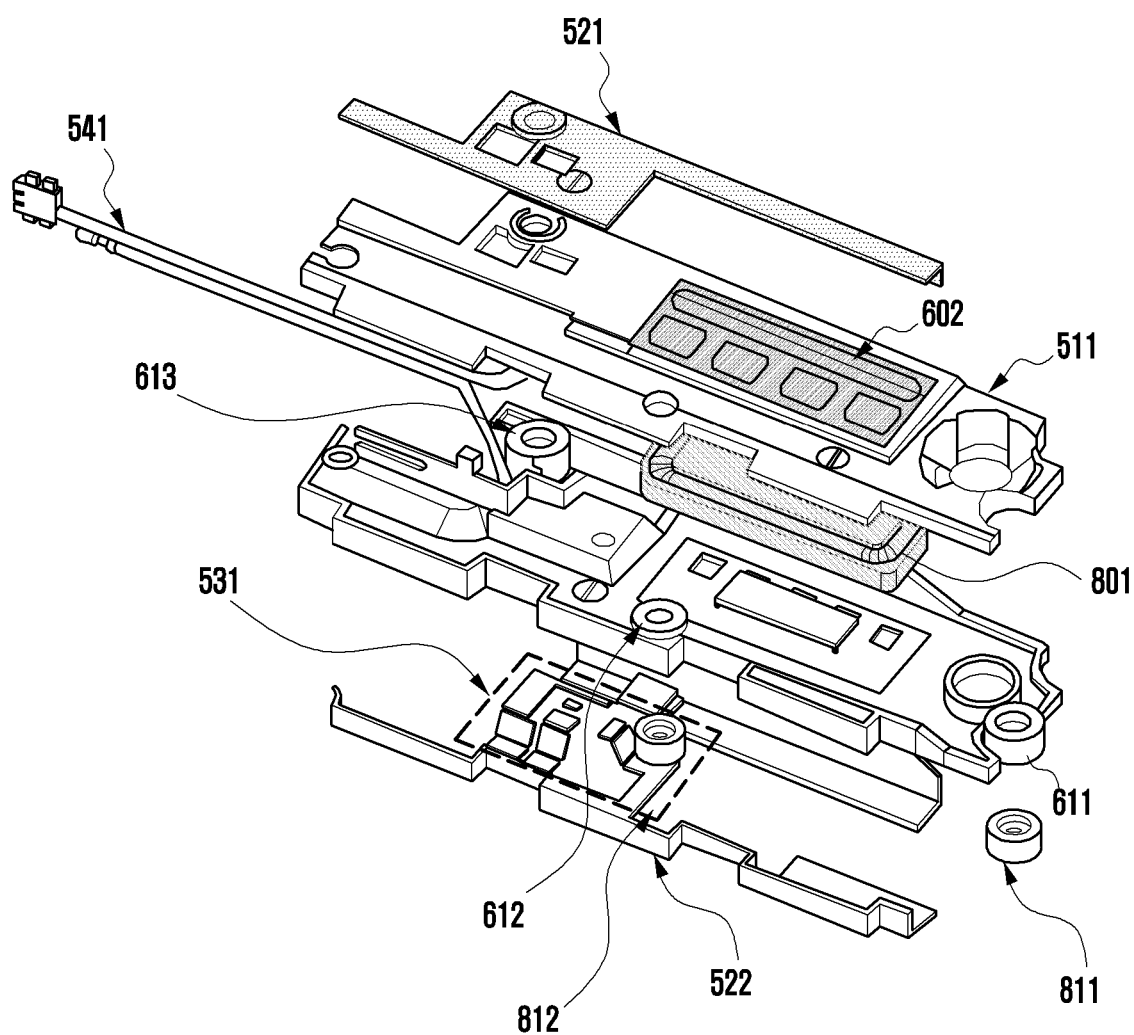

FIGS. 8A, 8B, and 8C are exploded perspective views of an antenna-integrated speaker module according to various embodiments of the disclosure.

The first case 511 may have the first antenna pattern 521 and the speaker cover 602 arranged on the surface of the first case 511.

A speaker unit 801 may be connected to the speaker cable 541, and be disposed in the space formed by the coupling of the first case 511 and the second case.

The antenna cable 542 may be disposed in the feeding area 531 of the second case 512.

The second case 512 may have a second antenna pattern 522 disposed on the surface of the second case 512.

The second case 512 may include the first fixation structure 611, the second fixation structure 612, and the third fixation structure 613. A first fixation member 811 may be coupled to the first fixation structure 611. A second fixation member 812 may be coupled to the second fixation structure 612. A third fixation member 813 may be coupled to the third fixation structure 613.

Figure 9:
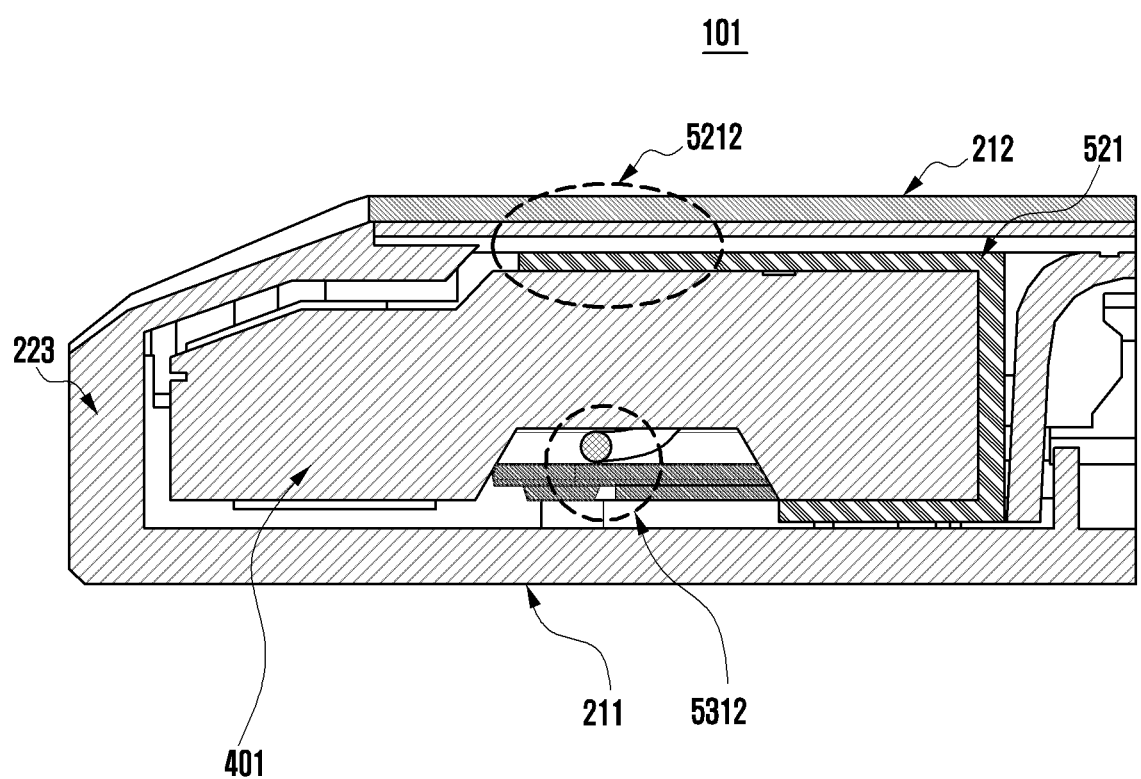
FIG. 9 is a view showing a cut surface of at least a part of an electronic device according to an embodiment of the disclosure.

FIG. 9 is a view showing a cut surface of at least a part of an electronic device according to an embodiment of the disclosure.

Referring to FIG. 9, the electronic device 101 may have the antenna-integrated speaker module 401 disposed in the space between the top cover 211 and the bottom cover 212 while being spaced apart therefrom by a predetermined distance T3 or more. The antenna-integrated speaker module 401 may be disposed to be spaced apart even from the third side surface 223 and an internal component of the electronic device 101 by the predetermined distance T3 or more.

In various embodiments, the predetermined distance T3 may be distances between the antenna-integrated speaker module 401 and the cover, the side surface, and/or an internal component, and the distances may be different distances. For example, the distance between the top cover 211 and the antenna-integrated speaker module 401, the distance between the bottom cover 212 and the antenna-integrated speaker module 401, the distance between the third side surface 223 and the antenna-integrated speaker module 401, and/or the distance between the internal component and the antenna-integrated speaker module 401 are the same as the T3, but may be different from one another.

In various embodiments, the antenna-integrated speaker module 401 may be disposed inside the first housing 201, and be disposed to be spaced apart from the first housing 201 and an internal component. In case that the antenna-integrated speaker module 401 is disposed to be spaced apart from the first housing 201, it may be possible to prevent at least one of noise or vibration generated by the first housing 201 from being directly transferred to the first housing 201.

In order to prevent the feeding area 531 from interfering and/or being in directly contact with the top cover 211, the antenna-integrated speaker module 401 may include a feeding area 531 having a concave shape.

The first antenna pattern 521 may be coupled to the second antenna pattern 522, and the first antenna pattern 521 may include a reflector pattern 5212 on the surface of the first case 511, which corresponds to the feeding area 531.

Figure 10A:
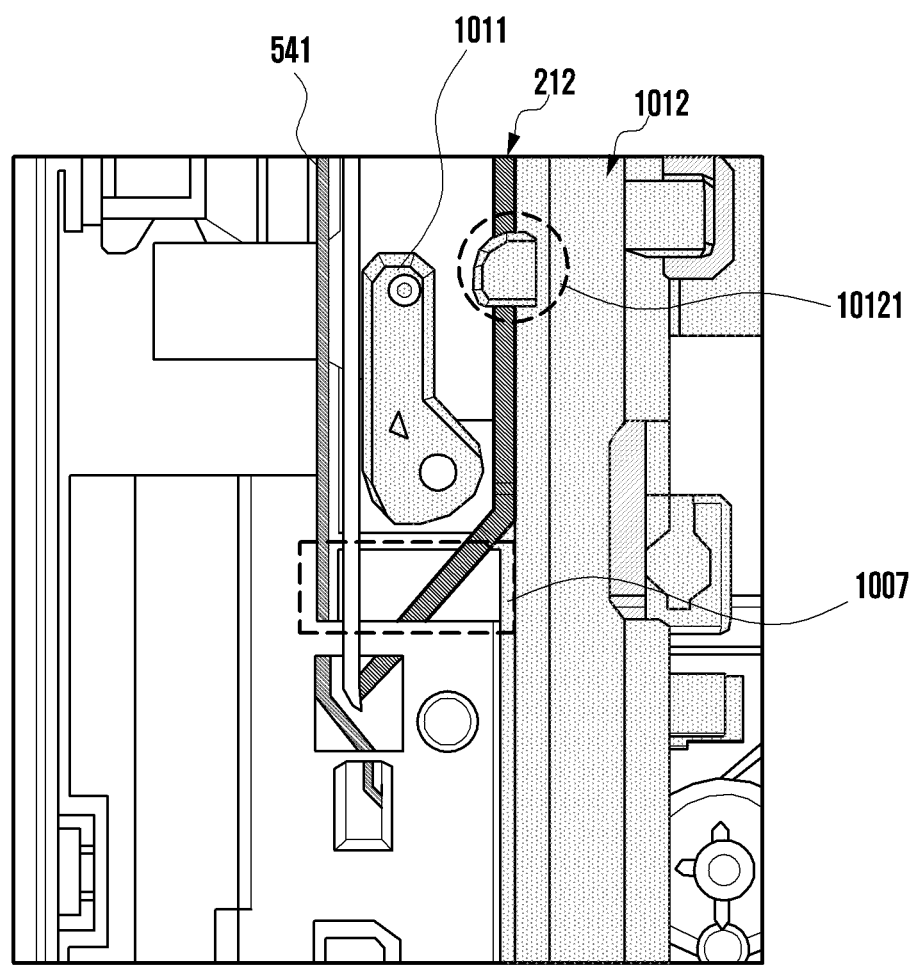
FIGS. 10A and 10B are views showing arrangement structures of a speaker cable and an antenna cable according to various embodiments of the disclosure.
Figure 10B:
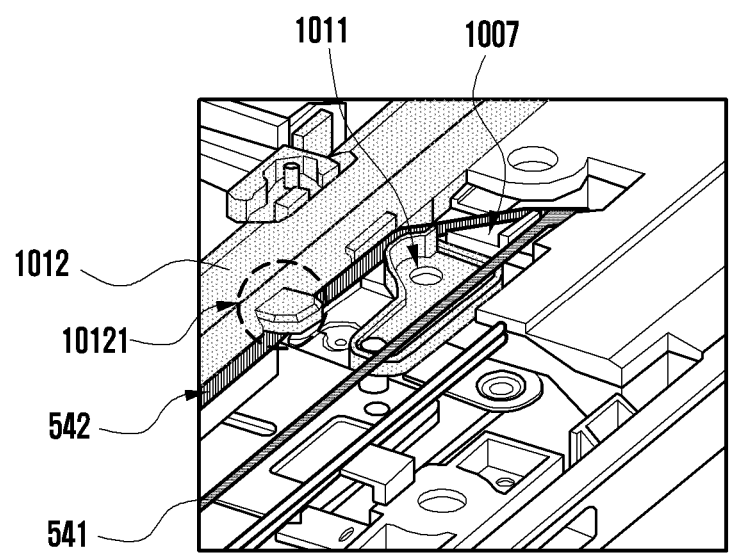

FIGS. 10A and 10B are views showing arrangement structures of a speaker cable and an antenna cable according to various embodiments of the disclosure.

Referring to FIGS. 10A and 10B, the antenna cable 542 may electrically connect at least one of the first antenna pattern 521 or the second antenna pattern 522 to at least one of the communication module 190 or an electric power source (the feeding) of the electronic device 101.

If at least one of the first antenna pattern 521 or the second antenna pattern 522 are electrically connected to at least one of the communication module 190 and/or an electric power source (the feeding) of the electronic device 101 by a fixation member such as a clip (e.g., a C-clip), since the antenna-integrated speaker module 401 is fixed to a housing (e.g., the first housing 201) of the electronic device 101, there may be a problem that sound and/or vibration output from the antenna-integrated speaker module 401 is transferred to the housing (e.g., the first housing 201).

The antenna-integrated speaker module 401 according to various embodiments of the disclosure may be configured to electrically connect at least one of the first antenna pattern 521 or the second antenna pattern 522 to at least one of the communication module 190 or an electric power source (feeding) of the electronic device 101 through the antenna cable 542, and thus the antenna-integrated speaker module 401 may maintain a state being spaced from a housing (e.g., the first housing 201) of the electronic device 101.

The speaker cable 541 may be formed of an FPCB cable and/or a copper cable.

The antenna cable 542 may be formed of a coaxial cable. The antenna cable 542 formed of a coaxial cable may generate tension. The antenna-integrated speaker module 401 may be tilted due to the tension of the antenna cable 542. The antenna-integrated speaker module 401 may include a guide structure for the antenna cable 542 to prevent the antenna-integrated speaker module 401 from tilting.

The antenna-integrated speaker module 401 may include a first antenna cable guide structure 1007, a second antenna cable guide structure 1011, and a third antenna cable guide structure 1012.

The first antenna cable guide structure 1007 may have a V-shape as a structure for branching the speaker cable 541 and the antenna cable 542.

The second antenna cable guide structure 1011 may fix the speaker cable 541, and may bring the antenna cable 542 to come into close contact with the third antenna cable guide structure 1012 so as to prevent the separation of the antenna cable 542.

The third antenna cable guide structure 1012 may guide the extending direction of the antenna cable 542 together with the second antenna cable guide structure 1011, and may prevent the separation of the antenna cable 542 by using a wing 10121.

Figure 11:
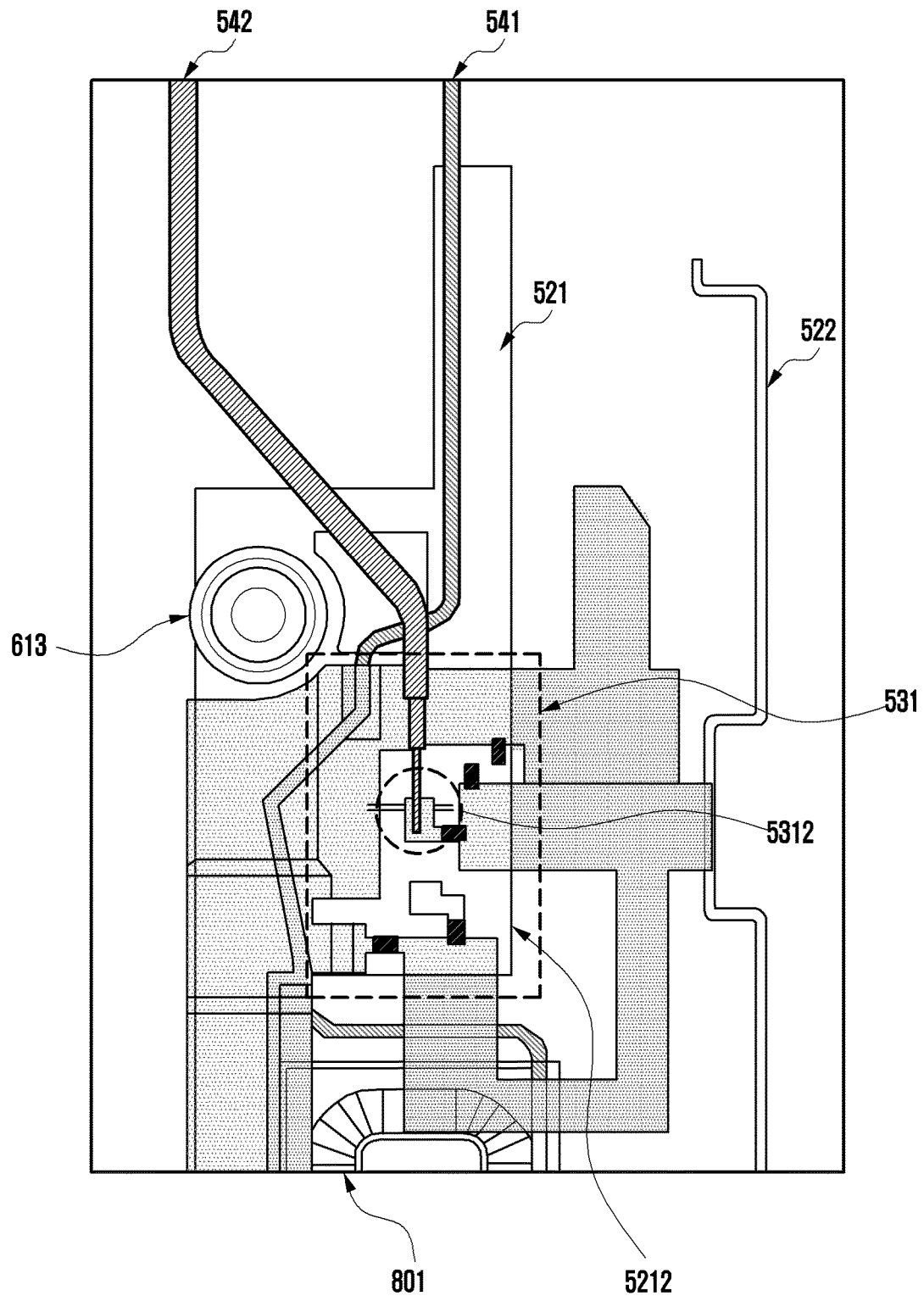
FIG. 11 is a view showing an arrangement of a first antenna pattern and a second antenna pattern according to an embodiment of the disclosure.

FIG. 11 is a view showing an arrangement of a first antenna pattern 521 and a second antenna pattern 522 according to an embodiment of the disclosure.

Referring to FIGS. 9 and 11, the first antenna pattern 521 may be coupled to the second antenna pattern 522, and the first antenna pattern 521 may include the reflector pattern 5212 corresponding to the feeding area 531.

The antenna cable 542 may be electrically connected to a feeding part 5312.

In various embodiments, the first antenna pattern 521 and the second antenna pattern 522 may not have a ground connected to other components and/or mechanisms arranged in the electronic device 101, and thus the antenna cable 542 may operate as a part of an antenna pattern. For example, the first antenna pattern 521, the second antenna pattern 522, and the antenna cable 542 operate as monopole antennas.

The reflector pattern 5212 may face at least a part of the feeding area 531. The reflector pattern 5212 may prevent energy, which is emitted from the feeding part 5312, from being dispersed by the bottom cover 212. The reflector pattern 5212 may have a cavity shape. In case that the reflector pattern 5212 corresponds to a radiation pattern of the second antenna pattern 522, there may occur a problem that the radiation performance of the second antenna pattern 522 degrades. Therefore, the reflector pattern 5212 may correspond to at least a part of the feeding area 531 without corresponding to or facing the radiation pattern of the second antenna pattern 522.

Figure 12:
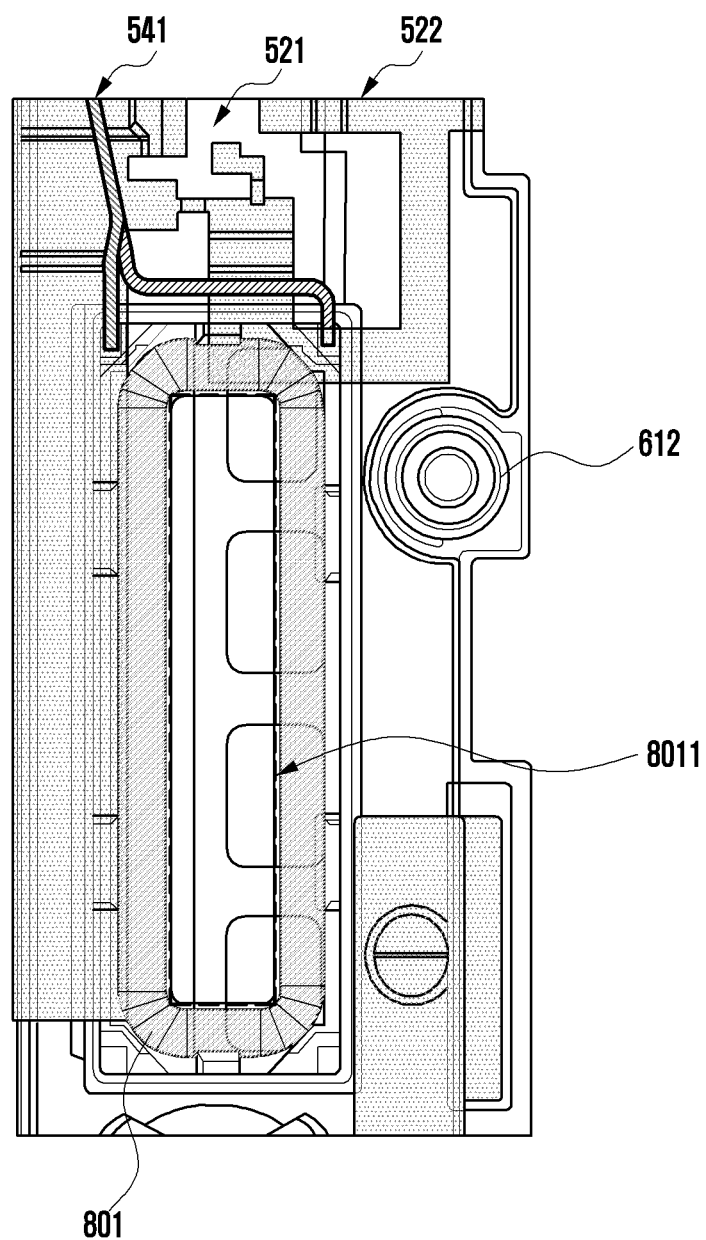
FIG. 12 is a view for explaining an arrangement of a speaker unit and an antenna pattern according to an embodiment of the disclosure.

FIG. 12 is a view for explaining an arrangement of a speaker unit and antenna patterns and according to an embodiment of the disclosure.

Figure 13:
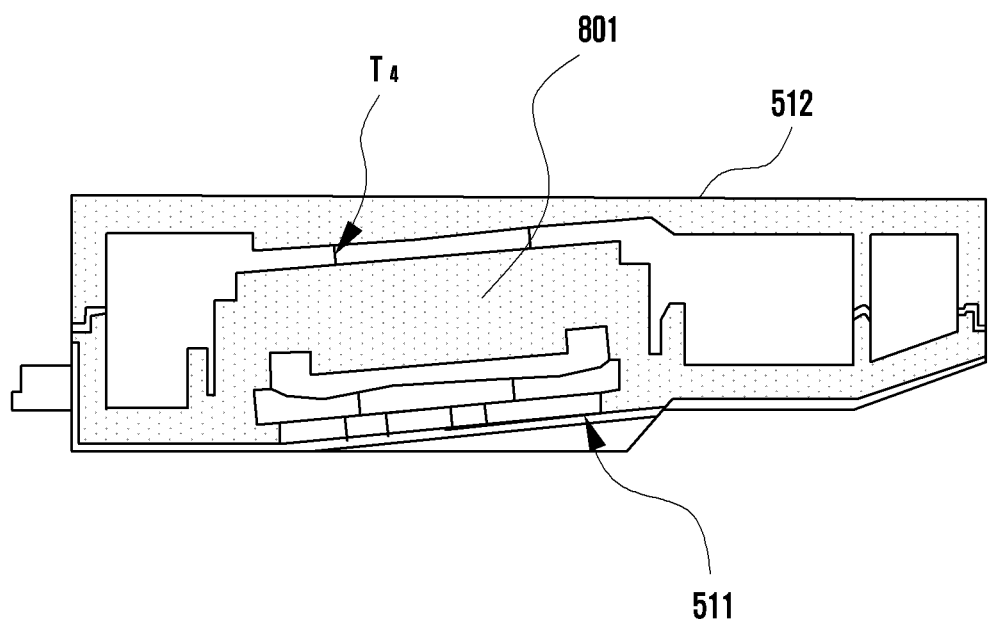
FIG. 13 is a view showing a cut surface of at least a part of an antenna-integrated speaker module according to an embodiment of the disclosure.

FIG. 13 is a view showing a cut surface of at least a part of an antenna-integrated speaker module according to an embodiment of the disclosure.

Referring to FIGS. 12 and 13, the speaker unit 801 may have a coil 8011 to have magnetism, or the speaker unit 801 may include one surface made of a metal material to prevent reflection of sound.

In case that the speaker unit 801 and the antenna patterns 521 and 522 having magnetism or a metal property overlap each other, there may be a problem that antenna performance degrades.

In various embodiments, the speaker unit 801 and the antenna patterns 521 and 522 may be arranged so as not to overlap. The coil 8011 of the speaker unit 801 and the antenna patterns 521 and 522 may be arranged so as not to overlap.

In this case, the area of the speaker unit 801, which is adjacent to the coil 8011, may be spaced apart from the second case 512 by the predetermined distance T4 or more, so as to prevent the antenna patterns 521 and 522 from being electrically and/or electromagnetically affected by the speaker unit 801.

Figure 14:
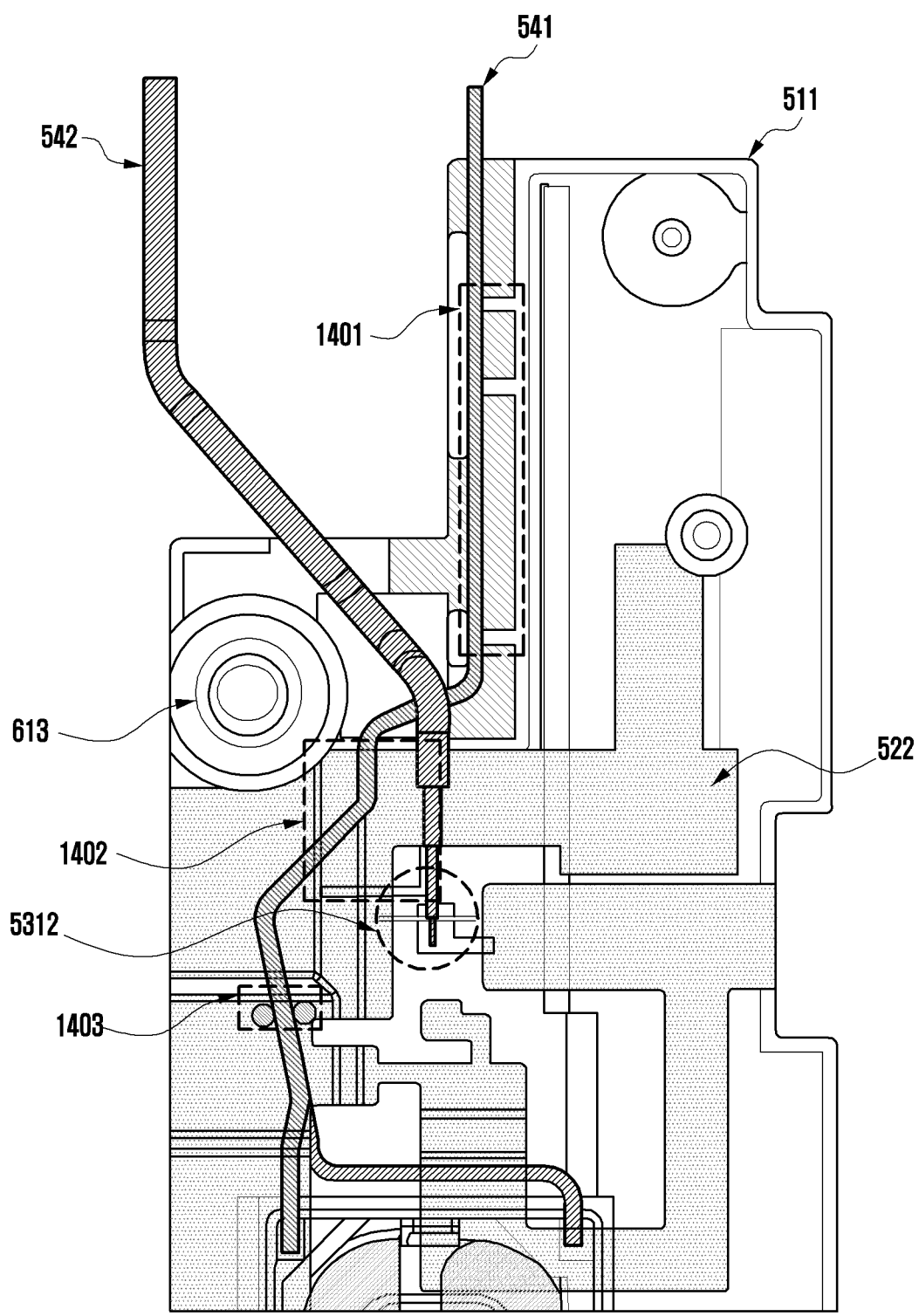
FIG. 14 is a view showing a speaker cable guide structure according to an embodiment of the disclosure.

FIG. 14 is a view showing a guide structure of a speaker cable according to an embodiment of the disclosure.

Referring to FIG. 14, the speaker cable 541 may be formed of an FPCB and/or a copper wire. Therefore, in case that the speaker cable 541 overlaps the antenna cable 542, there may occur performance degradation of the antenna cable 542 capable of performing the function of an antenna pattern. In various embodiments, a guide structure for the speaker cable 541 may be included to prevent the antenna cable 542 and the speaker cable 541 from overlapping each other and thus to secure the performance of the antenna cable 542.

A first speaker cable guide structure 1401, a second speaker cable guide structure 1402, and a third speaker cable guide structure 1403 may be included therein. The first speaker cable guide structure 1401 may perform a function which guides the speaker cable to extend in a state of being spaced apart from the antenna cable 542.

The second speaker cable guide structure 1402 and the third speaker cable guide structure 1403 may include guide structures which allow the second speaker cable guide structure and the third speaker cable guide structure to bypass the feeding part 5312 and the antenna patterns 521 and 522 without overlapping same.

Figure 15:
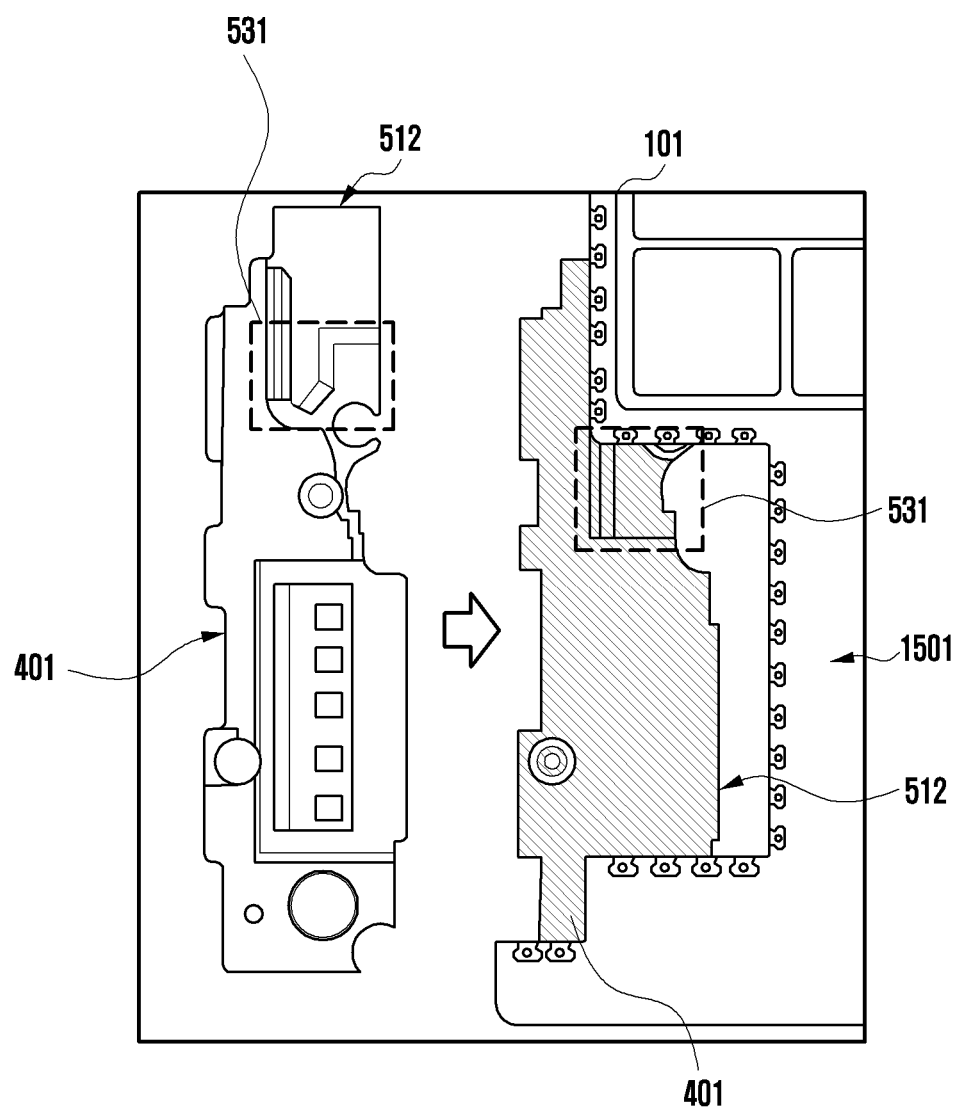
FIG. 15 is a view showing an electronic device and a feeding area according to an embodiment of the disclosure.

FIG. 15 is a view showing an electronic device and a feeding area according to an embodiment of the disclosure.

Referring to FIG. 15, in order to prevent the feeding area 531 from interfering and/or being in directly contact with the top cover 211, the antenna-integrated speaker module 401 may include a feeding area 531 having a concave shape.

The feeding area 531 may be disposed below the top cover 211 of the electronic device 101. At this time, due to the concave shape of the feeding area 531, at the time of feeding an antenna, the interference with a metal material 1501, for example, a metal material of the keyboard, which is disposed on the top cover 211, is minimized.

Figure 16:
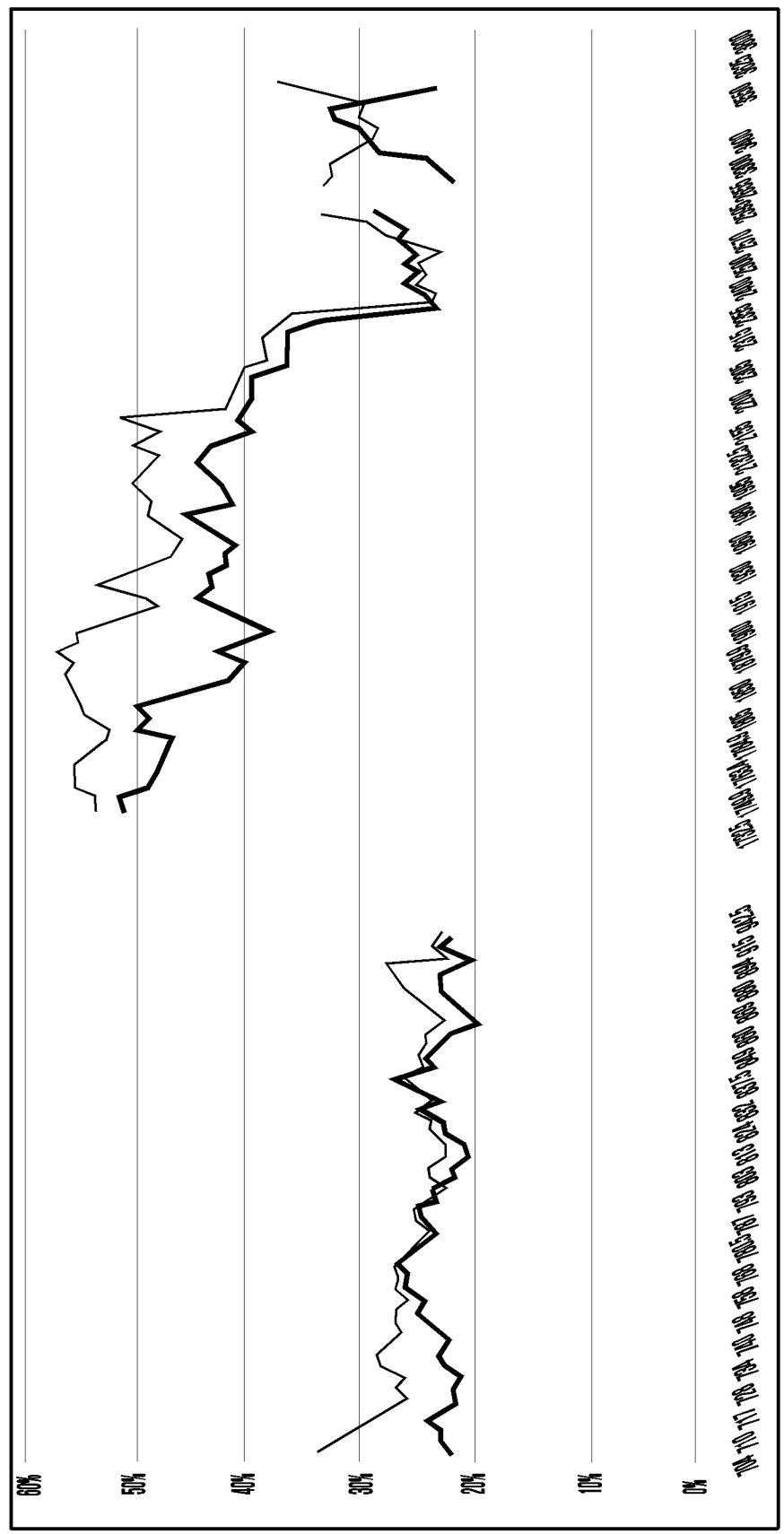
FIG. 16 is a graph showing antenna efficiency according to an embodiment of the disclosure.

FIG. 16 is a graph showing antenna efficiency according to an embodiment of the disclosure.

Referring to FIG. 16, the x-axis of the graph is the frequency band, and the y-axis of the graph is the antenna efficiency. The frequency bands are between the 700 megahertz (MHz)-900 MHz band and the 1.7 gigahertz (GHz)-3.7 GHz band. Comparing the antenna efficiency 1602 and 1605 of the conventional antenna and the antenna efficiency 1601 and 1603 of the antenna according to the embodiment of the disclosure, it may be seen that the antenna efficiency of the antenna according to the embodiment of the disclosure is greatly improved.

The electronic device according to various embodiments disclosed herein may be one of various types of electronic devices. The electronic devices include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" is implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) invokes at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising a housing, the electronic device comprising:
    a display module;
    a communication module;
    at least one processor; and
    a speaker,
    wherein the speaker comprises a speaker enclosure having a first surface and a second surface,
    wherein the speaker enclosure is disposed in an inner space of the housing to be spaced a predetermined interval apart therefrom,
    wherein a first antenna pattern comprising a ground pattern is disposed on the first surface and a second antenna pattern comprising a radio frequency (RF) radiation pattern is disposed on the second surface, and
    wherein at least a portion of the second antenna pattern is electrically connected to the ground pattern.

2. The electronic device of claim 1,
    wherein the first antenna pattern comprises a reflector pattern.

3. The electronic device of claim 2,
    wherein the second antenna pattern comprises a feeding area, and
    wherein the reflector pattern is disposed on the second surface, which corresponds to the feeding area.

4. The electronic device of claim 1, further comprising:
    a speaker cable electrically connected to a speaker component; and
    an antenna cable electrically connected to the second antenna pattern.

5. The electronic device of claim 4, further comprising:
    a speaker cable guide structure configured to prevent the speaker cable from overlapping at least one of the second antenna pattern or the antenna cable; and
    an antenna cable guide structure configured to prevent the speaker enclosure from being tilted by the antenna cable,
    wherein the speaker cable comprises at least one of a flexible printed circuits board (FPCB) or a copper wire, and
    wherein the antenna cable comprises a coaxial cable.

6. The electronic device of claim 1, wherein the speaker enclosure comprises at least a part having a concave shape configured to prevent a feeding area from being at least one of in contact or interfering with the housing.

7. The electronic device of claim 1, further comprising a speaker cover,
    wherein the speaker cover is coupled to the first surface.

8. The electronic device of claim 1,
    wherein the speaker enclosure further comprises:
    at least one fixation structure configured to maintain a distance with the housing, and
    at least one fixation member coupled to the at least one fixation structure, and wherein the at least one fixation member is made of rubber or silicone.

9. The electronic device of claim 1, wherein the speaker enclosure is coupled using at least one of ultrasonic fusing, bonding, or hooking.

10. The electronic device of claim 1, wherein the speaker enclosure is spaced a predetermined distance or more apart from at least one of a component or a mechanism disposed inside the housing.

11. The electronic device of claim 1, wherein a coil of the speaker is disposed inside the speaker enclosure to be spaced a predetermined distance or more apart therefrom.

12. The electronic device of claim 1, wherein at least one of the first antenna pattern or the second antenna pattern is formed of at least one of a flexible printed circuits board (FPCB) or stainless steel, or formed by plating on the speaker enclosure through a laser direct structuring (LDS) process.

13. The electronic device of claim 1,
wherein the speaker enclosure has a rectangular shape, and
wherein the speaker enclosure further comprises a protrusion structure in at least a part thereof.

14. The electronic device of claim 2,
wherein the reflector pattern has a cavity shape, and
wherein the reflector pattern is configured so as not to overlap the RF radiation pattern.

15. The electronic device of claim 4, wherein the speaker component comprises a coil.

16. The electronic device of claim 1,
wherein the speaker enclosure is disposed within an inner space of the housing of the electronic device, and
wherein the second surface of the speaker enclosure is oriented to face toward a top cover of the housing of the electronic device.

* * * * *